United States Patent
Yang et al.

(10) Patent No.: US 10,839,599 B2
(45) Date of Patent: Nov. 17, 2020

(54) METHOD AND DEVICE FOR THREE-DIMENSIONAL MODELING

(71) Applicant: ARCSOFT CORPORATION LIMITED, Hangzhou (CN)

(72) Inventors: Hongzhuang Yang, Hangzhou (CN); Long Zhang, Hangzhou (CN); Wen Zhou, Hangzhou (CN); Wei Zhou, Hangzhou (CN); Jin Wang, Hangzhou (CN)

(73) Assignee: ARCSOFT CORPORATION LIMITED, Hangzhou (CN)

( * ) Notice: Subject to any disclaimer, the term of this patent is extended or adjusted under 35 U.S.C. 154(b) by 108 days.

(21) Appl. No.: 16/167,491

(22) Filed: Oct. 22, 2018

(65) Prior Publication Data
US 2019/0122429 A1    Apr. 25, 2019

(30) Foreign Application Priority Data
Oct. 20, 2017   (CN) .......................... 2017 1 0985124

(51) Int. Cl.
*G06T 17/05*   (2011.01)
*G06T 7/50*    (2017.01)
*G06K 9/00*    (2006.01)
*G06T 19/20*   (2011.01)

(52) U.S. Cl.
CPC .......... *G06T 17/05* (2013.01); *G06K 9/00208* (2013.01); *G06K 9/00221* (2013.01); *G06K 9/00275* (2013.01); *G06T 7/50* (2017.01); *G06T 19/20* (2013.01); *G06T 2200/04* (2013.01); *G06T 2207/10028* (2013.01); *G06T 2210/56* (2013.01); *G06T 2219/2021* (2013.01)

(58) Field of Classification Search
CPC ........... G06T 17/00; G06T 17/20; G06T 1/00; G06T 17/05; G06T 19/20; G06T 7/50; G06T 2210/56; G06T 2219/2021; G06T 2207/10028; G06T 2200/04; G06T 2207/10024; G06T 2207/30201; G06T 5/50; G06K 9/00275; G06K 9/00255; G06K 9/00208; G06K 9/00281; G06K 9/00248; G06K 9/00664; G06K 9/00201; G06K 9/00221
See application file for complete search history.

(56) References Cited

U.S. PATENT DOCUMENTS

| | | | |
|---|---|---|---|
| 2015/0009207 A1* | 1/2015 | Guo | ........................ G06T 7/593 345/419 |
| 2018/0005448 A1* | 1/2018 | Choukroun | ............. G06F 3/005 |

* cited by examiner

*Primary Examiner* — Diane D Mizrahi
(74) *Attorney, Agent, or Firm* — Bayramoglu Law Offices LLC

(57) ABSTRACT

The present invention provides a method and a device for three-dimensional modeling, used in the field of image processing. The method includes: receiving a first two-dimensional image and a depth map corresponding to the first two-dimensional image; the first two-dimensional image and the depth map respectively include a face; fitting three-dimensional face model by a first three-dimensional face database according to a position of a face feature point in the first two-dimensional image and the depth map corresponding to the first two-dimensional image. The method and the device for three-dimensional modeling provided by the present invention can improve the efficiency of the facial three-dimensional modeling and the precision of modeling.

24 Claims, 4 Drawing Sheets

METHOD AND DEVICE FOR THREE-DIMENSIONAL MODELING

CROSS REFERENCE TO RELATED APPLICATIONS

This application is based upon and claims priority to Chinese Patent Application No. CN201710985124.3, filed on Oct. 20, 2017, the entire contents of which are incorporated herein by reference.

TECHNICAL FIELD

The present invention relates to a method and a device for image processing, and in particular to a method and a device for three-dimensional modeling.

BACKGROUND

At present, the research on the relevant technology for shooting three-dimensional images has been developed for several decades. The early device for shooting three-dimensional images mainly used professional sensors such as the laser sensor, the structured light sensor and the large-scale camera arrays sensor, which has a high accuracy of reconstructing three-dimensional models. However, it is only suitable for the large organization, not for the small enterprise or domestic consumer due to the high price. In recent years, with the development of technology, many low-cost devices for capturing three-dimensional images have emerged, such as the device with a depth camera that can automatically move. Such devices require the user to rotate a certain angle according to the voice prompt, and in the meantime, the depth camera automatically moves up and down so as to shoot the depth maps of the photographed object at various angles. Finally, the depth maps shot at various angles are combined by algorithm into a complete three-dimensional model of the photographed object.

In the prior art, the method for facial three-dimensional modeling has a low efficiency and a low accuracy.

SUMMARY

The present invention provides a method and a device for three-dimensional modeling, which can solve the problem of the low efficiency and the low precision of the method for facial three-dimensional modeling in the prior art.

A first aspect of the present invention provides a method for three-dimensional modeling. The method includes: receiving a first two-dimensional image and a depth map corresponding to the first two-dimensional image, wherein the first two-dimensional image and the depth map respectively include a face; and fitting a three-dimensional face model by the first three-dimensional face database according to a position of a face feature point in the first two-dimensional image and the depth map corresponding to the first two-dimensional image.

According to the first aspect of the present invention, in the first executable mode of the first aspect of the present invention, the first three-dimensional face database may include an average face model and at least one of a shape feature vector and an expression feature vector.

According to the first executable mode of the first aspect of the present invention, in the second executable mode of the first aspect of the present invention, the step of fitting the three-dimensional face model by the first three-dimensional face database according to the position of the face feature point in the first two-dimensional image and the depth map corresponding to the first two-dimensional image may include: estimating an initial transformation matrix of the three-dimensional point cloud model corresponding to the depth map from the average face model, according to the initial transformation matrix and at least one of the shape feature vector and the expression feature vector, and aiming at a first condition, fitting the three-dimensional face model from the average face model.

According to the second executable mode of the first aspect of the present invention, in a third executable mode of the first aspect of the present invention, the first condition may include at least one of the following: the distance between a projection position of the feature point of the three-dimensional face model in the image coordinate system and a position of the feature point of the first two-dimensional image corresponding to the feature point of the three-dimensional face model is smallest; and the distance between the three-dimensional face model and a point pair corresponding to the three-dimensional point cloud mapped by the depth map is smallest.

According to the second executable mode or the third executable mode of the first aspect of the present invention, in a fourth executable mode of the first aspect of the present invention, the step of estimating the initial transformation matrix of the three-dimensional point cloud model corresponding to the depth map from the average face model may include: calculating a three-dimensional position of the face feature point according to the position of the face feature point in the first two-dimensional image and the depth map corresponding to the first two-dimensional image; and estimating the initial transformation matrix of the three-dimensional point cloud model corresponding to the depth map from the average face model according to the three-dimensional position of the face feature point and the three-dimensional position of the feature point of the average face model.

A second aspect of the present invention provides a device for three-dimensional modeling, including: a receiver, configured to receive a first two-dimensional image and a depth map corresponding to the first two-dimensional image, wherein the first two-dimensional image and the depth map respectively include a face; a processor, configured to fit a three-dimensional face model by a first three-dimensional face database according to a position of a face feature point in the first two-dimensional image and the depth map corresponding to the first two-dimensional image.

According to the second aspect of the present invention, in a first executable mode of the second aspect of the present invention, the first three-dimensional face database may include an average face model and at least one of a shape feature vector(s) and an expression feature vector.

According to the first executable mode of the second aspect of the present invention, in a second executable mode of the second aspect of the present invention, the processor is specifically configured to: estimate an initial transformation matrix of the three-dimensional point cloud model corresponding to the depth map from the average face model, according to the initial transformation matrix and at least one of the shape feature vector and the expression feature vector, and aiming at a first condition, fit the three-dimensional face model from the average face model.

According to the second executable mode of the second aspect of the present invention, in a third executable aspect of the second aspect of the present invention, the first condition may include at least one of the following: the distance between a projection position of the feature point of the three-dimensional face model in the image coordinate system and a position of the feature point of the first two-dimensional image corresponding to the feature point of the three-dimensional face model is smallest; and the distance between the three-dimensional face model and a point pair corresponding to the three-dimensional point cloud mapped by the depth map is smallest.

According to the second executable mode or the third executable mode of the second aspect of the present invention, in a fourth executable mode of the second aspect of the present invention, the processor may be specifically configured to: calculate a three-dimensional position of the face feature point according to the position of the face feature point in the first two-dimensional image and the depth map corresponding to the first two-dimensional image; and estimate the initial transformation matrix of the three-dimensional point cloud model corresponding to the depth map from the average face model according to the three-dimensional position of the face feature point and the three-dimensional position of the feature point of the average face model.

A third aspect of the present invention provides a computer readable storage medium. The computer readable storage medium stores a computer program. When the computer program is executed by a first processor, the steps in the first aspect of the present invention or any of the first executable mode to the fourth executable mode of the first aspect are performed.

A fourth aspect of the present invention provides a device for three-dimensional modeling, including: a memory, a second processor, and a computer program stored in the memory and operated by the second processor. When the computer program is executed by the second processor, the steps in the first aspect of the present invention or any of the first executable mode to the fourth executable mode of the first aspect are performed.

The method and the device for three-dimensional modeling provided by the present invention can improve the efficiency of the facial three-dimensional modeling and the precision of modeling.

DETAILED DESCRIPTION OF THE EMBODIMENTS

Figure 1:
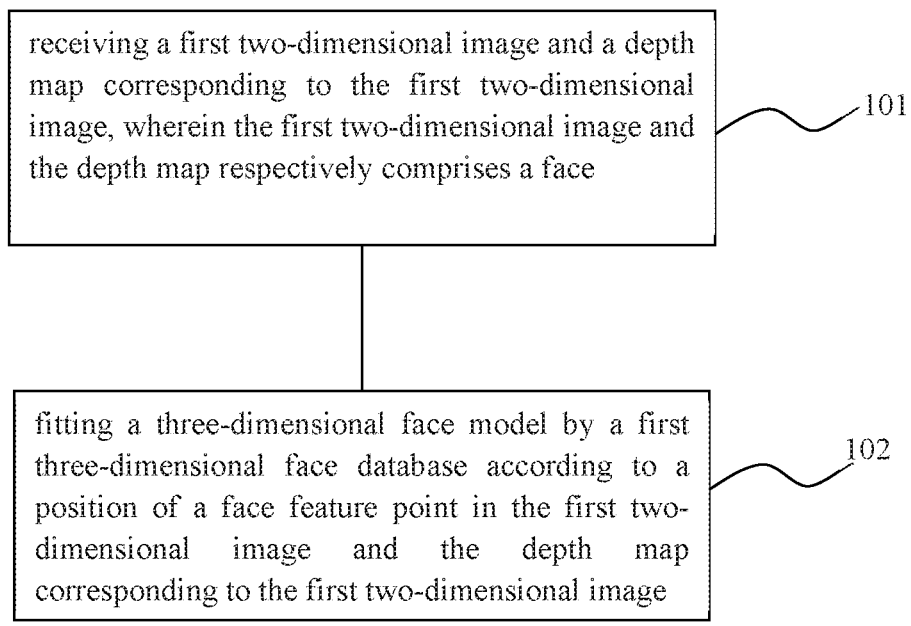
FIG. 1 is a flowchart of a method for three-dimensional modeling provided by Embodiment One of the present invention.

The technical solutions of the embodiments of the present invention are described in detail below with reference to the accompanying drawings in the embodiments of the present invention.

The terms "first", "second", etc., in the above-described drawings in the specification and claims of the present invention are used to distinguish different objects, and are not intended to limit the specific order.

The term "and/or" in the embodiments of the present invention is merely an association relationship describing an associated object, indicating that there can be three relationships, for example, A and/or B can indicate that there are three cases in which A exists alone, A and B exist simultaneously, and B exists alone.

In the embodiments of the present invention, the words "exemplary" or "for example" are used to mean an example, an illustration, or a description. Any embodiment or design described as "exemplary" or "for example" in the embodiments of the present invention should not be construed as preferred or advantageous over other embodiments or designs. Rather, the use of the words "exemplary" or "for example" is intended to present relevant concepts in a specific manner.

It should be noted that, for the sake of brevity and clarity of the drawings, the elements shown in the drawings are not necessarily drawn to scale. For example, the size of some elements can be increased relative to other elements for clarity. Further, where considered appropriate, reference numerals can be repeated among the drawings to indicate corresponding or similar elements.

A method for three-dimensional modeling provided by Embodiment One of the present invention will be described in detail below with reference to FIG. 1. As shown in FIG. 1, the method includes the following steps.

Step 101: a first two-dimensional image and a depth map corresponding to the first two-dimensional image are received, the first two-dimensional image and the depth map respectively include a face.

Optionally, the first two-dimensional image can be a color image, such as an RGB (Red Green Blue) image. Optionally, the above-mentioned receiving action can include acquiring the first two-dimensional image and a depth map corresponding to the first two-dimensional image from the storage device. The storage device can be a ROM (Read-Only Memory), a RAM (Random Access Memory), or a flash memory.

Step 102: a three-dimensional face model is fitted by the first three-dimensional face database according to a position of a face feature point in the first two-dimensional image and the depth map corresponding to the first two-dimensional image.

Optionally, the first three-dimensional face database includes an average face model and at least one of a shape feature vector and an expression feature vector. Fitting the three-dimensional face model by the first three-dimensional face database according to the position of the face feature point in the first two-dimensional image and the depth map corresponding to the first two-dimensional image includes: estimating an initial transformation matrix of the three-dimensional point cloud model corresponding to the depth map from the average face model, according to the initial transformation matrix and at least one of the shape feature vector and the expression feature vector, and aiming at a first condition, fitting the three-dimensional face model from the average face model. The first condition includes at least one of the following: the distance between a projection position of the feature point of the three-dimensional face model in the image coordinate system and a position of the feature point of the corresponding first two-dimensional image is smallest or convergent or as small as possible; the distance between the fitted three-dimensional face model and a point pair corresponding to the three-dimensional point cloud mapped by the depth map is smallest or convergent or as small as possible. Optionally, the first three-dimensional face database can be pre-stored in the device, such as a mobile phone, a tablet computer, etc.

Estimating the initial transformation matrix of the three-dimensional point cloud model corresponding to the depth map from the average face model includes: calculating a three-dimensional position of the face feature point according to the position of the face feature point in the first two-dimensional image and the depth map corresponding to the first two-dimensional image; estimating the initial transformation matrix of the three-dimensional point cloud model corresponding to the depth map from the average face model according to the three-dimensional position of the face feature point and the three-dimensional position of the feature point of the average face model.

Optionally, the first two-dimensional image can be a color image, and can be one sheet. The depth map can also be one sheet. In the first three-dimensional face database described above, a three-dimensional face model with an arbitrary expression can be expressed as:

$$F=\overline{F}+A_{id}\alpha_{id}+A_{exp}\alpha_{exp};$$

wherein $\overline{F}$ is the average face model in the first three-dimensional face database; $A_{id}$ is the shape feature vector of Principal Components Analysis (PCA) in the first three-dimensional face database; $A_{exp}$ is the expression feature vector of PCA in the first three-dimensional face database; $\alpha_{id}$ is a shape parameter and $\alpha_{exp}$ is an expression parameter.

The face feature point in the color image is detected to obtain a two-dimensional position of the face feature point in the color image. According to the correspondence between the color image and the depth map, and a perspective projection model, the three-dimensional position of the face feature point is obtained and recorded as Q. The position of the feature point corresponding to the detected feature point is found in the first three-dimensional face database (the canthus corresponds to the canthus, and the nasal tip corresponds to the nasal tip), and is recorded as P. The initial transformation matrix between P and Q, that is, an initial attitude $T_0$ of a camera device, can be obtained by an Iterative Closest Point (ICP) algorithm. Then, through the first three-dimensional face database and the initial transformation matrix, the estimation of an attitude T, the shape parameter $\alpha_{id}$, and the expression parameter $\alpha_{exp}$ is iteratively performed until a fitting error is reduced to a preset threshold value $\delta$. In the iterative process, the three-dimensional face model is fitted by the average face model, aiming at least one of the following conditions: the distance between a projection position of the feature point of the three-dimensional face model in the image coordinate system and a position of the feature point of the corresponding first two-dimensional image is smallest or convergent or as small as possible, which can be referred to as a fitting term of a face feature; the distance between the fitted three-dimensional face model and a point pair corresponding to the three-dimensional point cloud mapped by the depth map is smallest or convergent or as small as possible, which can be referred to as a fitting term of the depth information.

Wherein the fitting term of the face feature: the error between the projection position of the feature point of the three-dimensional face model in the image coordinate system and the position of the feature point of the first two-dimensional image is smallest or convergent, which makes the two positions as near as possible. It is assumed that the three-dimensional face model fitted by the step k−1 is $F_{k-1}$, and the attitude of the camera device is $T_{k-1}$. The three-dimensional coordinates of the face feature point $P_{k-1}$ of $F_{k-1}$ is obtained. Each point p (for example, a canthus point) of $P_{k-1}$ under the attitude $T_{k-1}$ is projected onto the image coordinate system of the color image to obtain the projection coordinate (u', v'). In the two-dimensional color image, the position (u, v) on the image corresponding top (for example, the canthus point) is extracted. Then the value of $\|(u', v')-(u, v)\|^2$ should be as small as possible.

The fitting term of the depth information: the distance between the fitted three-dimensional face model and a point pair corresponding to the three-dimensional point cloud mapped by the depth map is smallest or convergent or as small as possible, which makes the fitted three-dimensional face model $F_{k-1}$ as close as possible to the face model in the acquired depth map. The depth map data is converted to three-dimensional point cloud data and recorded as M. For any point p in $F_{k-1}$, according to the kd tree search algorithm, a nearest point q can be searched in M, and (p, q) is regarded as the corresponding point pair. The purpose is to make the corresponding point pair close to each other, that is, the value of $\|p-q\|^2$ should be as small as possible.

Optionally, the iterative process can be solved through a conjugate gradient algorithm. In order to accelerate the solving process, the attitude, the shape parameter and the expression parameter of the camera device are independently solved in each step of the iteration process, that is, when the attitude of the camera device is solved, the shape parameter and the expression parameter are constant. The solving of the shape parameter and the expression parameter are similar.

By the method described in the embodiment of the present invention, only one color image and a depth map corresponding to the color image is required to improve the efficiency of the facial three-dimensional modeling and meanwhile improve the accuracy of modeling. Preferably, if there are a plurality of color images and the depth maps corresponding to the color images, the accuracy of the modeling can be further improved by the method.

Figure 2:
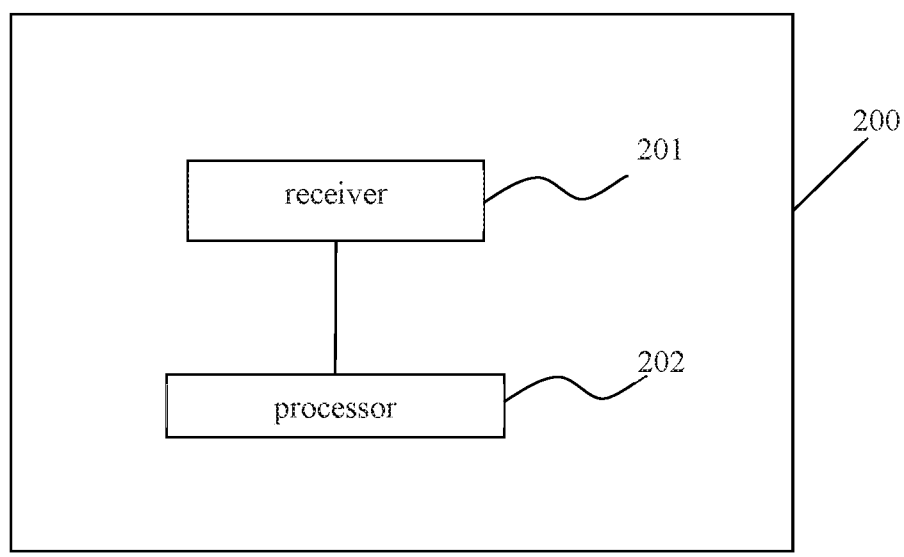
FIG. 2 is a structural diagram of a device for three-dimensional modeling provided by Embodiment Two of the present invention.

A device 200 for three-dimensional modeling provided by Embodiment Two of the present invention will be described in detail below with reference to FIG. 2. As shown in FIG. 2, the device 200 includes: receiver 201 and processor 202.

The receiver 201 is used for receiving a first two-dimensional image and a depth map corresponding to the first two-dimensional image, wherein the first two-dimensional image and the depth map respectively include a face.

Optionally, the first two-dimensional image can be a color image, such as an RGB (Red Green Blue) image. Optionally, the above-mentioned receiving action can include acquiring the first two-dimensional image and the depth map corresponding to the first two-dimensional image from the storage device. The storage device can be a ROM, a RAM, or a flash memory.

The processor is used for fitting a three-dimensional face model by a first three-dimensional face database according to a position of a face feature point in the first two-dimensional image and the depth map corresponding to the first two-dimensional image.

Optionally, the first three-dimensional face database includes an average face model and at least one of a shape feature vector and an expression feature vector.

The processor 202 is specifically used for estimating an initial transformation matrix of the three-dimensional point cloud model corresponding to the depth map from the average face model, according to the initial transformation matrix and at least one of the shape feature vector and the expression feature vector, and aiming at a first condition, fitting the three-dimensional face model from the average face model.

The first condition includes at least one of the following: the distance between a projection position of the feature point of the fitted three-dimensional face model in the image coordinate system and a position of the feature point of the corresponding first two-dimensional image is smallest or convergent or as small as possible; the distance between the fitted three-dimensional face model and a point pair corresponding to the three-dimensional point cloud mapped by the depth map is smallest or convergent or as small as possible.

The processor 202 is specifically used for calculating a three-dimensional position of the face feature point according to the position of the face feature point in the first two-dimensional image and the depth map corresponding to the first two-dimensional image; estimating the initial transformation matrix of the three-dimensional point cloud model corresponding to the depth map from the average face model according to the three-dimensional position of the face feature point and the three-dimensional position of the feature point of the average face model.

Optionally, the first two-dimensional image can be a color image, and can be one sheet. The depth map can also be one sheet. In the first three-dimensional face database described above, a three-dimensional face model with an arbitrary expression can be expressed as:

$$F=\overline{F}+A_{id}\alpha_{id}+A_{exp}\alpha_{exp};$$

wherein $\overline{F}$ is the average face model in the first three-dimensional face database; $A_{id}$ is the shape feature vector of Principal Components Analysis (PCA) in the first three-dimensional face database; $A_{exp}$ is the expression feature vector of PCA in the first three-dimensional face database; $\alpha_{id}$ is a shape parameter and $\alpha_{exp}$ is an expression parameter.

The face feature point in the color image is detected to obtain a two-dimensional position (u, v) of the face feature point in the color image. According to the correspondence between the color image and the depth map, and a perspective projection model, the three-dimensional position of the face feature point is obtained and recorded as Q. The position (the canthus corresponds to the canthus, and the nasal tip corresponds to the nasal tip) of the feature point corresponding to the detected feature point is found in the first three-dimensional face database, and is recorded as P. The initial transformation matrix between P and Q, that is, an initial attitude $T_0$ of a camera device, can be obtained by an Iterative Closest Point (ICP) algorithm. Then, through the first three-dimensional face database and the initial transformation matrix, the estimation of an attitude T, the shape parameter $\alpha_{id}$, and the expression parameter $\alpha_{exp}$ is iteratively performed until a fitting error is reduced to a preset threshold value δ. In the iterative process, the three-dimensional face model is fitted by the average face model, aiming at least one of the following conditions: the distance between a projection position of the feature point of the fitted three-dimensional face model in the image coordinate system and a position of the feature point of the corresponding first two-dimensional image is smallest or convergent or as small as possible, which can be referred to as a fitting term of a face feature; the distance between the fitted three-dimensional face model and a point pair corresponding to the three-dimensional point cloud mapped by the depth map is smallest or convergent or as small as possible, which can be referred to as a fitting term of the depth information.

Wherein the fitting term of the face feature: the error between the projection position of the feature point of the fitted three-dimensional face model in the image coordinate system and the position of the feature point of the first two-dimensional image is smallest or convergent, which makes the two positions as near as possible. It is assumed that the three-dimensional face model fitted by the step k−1 is $F_{k-1}$, and the attitude of the camera device is $T_{k-1}$. The three-dimensional coordinates of the face feature point $P_{k-1}$ of $F_{k-1}$ is obtained. Each point p (for example, a canthus point) of $P_{k-1}$ under the attitude $T_{k-1}$ is projected onto the image coordinate system where the color image is located to obtain the projection coordinate (u', v'). In the two-dimensional color image, the position (u, v) on the image corresponding top (for example, the canthus point) is extracted. Then the value of $\|(u', v')-(u, v)\|^2$ should be as small as possible.

The fitting term of the depth information: the distance between the fitted three-dimensional face model and a point pair corresponding to the three-dimensional point cloud mapped by the depth map is smallest or convergent or as small as possible, which makes the fitted three-dimensional face model $F_{k-1}$ as close as possible to the face model in the acquired depth map. The depth map data is converted to three-dimensional point cloud data and recorded as M. For any point p in $F_{k-1}$, according to the kd tree search algorithm, a nearest point q can be searched in M, and (p, q) is regarded as the corresponding point pair. The purpose is to make the corresponding point pair close to each other, that is, the value of $\|p-q\|^2$ should be as small as possible.

Optionally, the iterative process can be solved through a conjugate gradient algorithm. In order to accelerate the solving process, the attitude, the shape parameter and the expression parameter of the camera device are independently solved in each step of the iteration process, that is, when the attitude of the camera device is solved, the shape parameter and the expression parameter are constant. The solving of the shape parameter and the expression parameter are similar.

By the method described in the embodiment of the present invention, only one color image and a depth map corresponding to the color image are required to improve the efficiency of the facial three-dimensional modeling and meanwhile improve the accuracy of modeling. Preferably, if there are a plurality of color images and the depth maps corresponding to the color images, the accuracy of the modeling can be further improved by the method.

Figure 3:
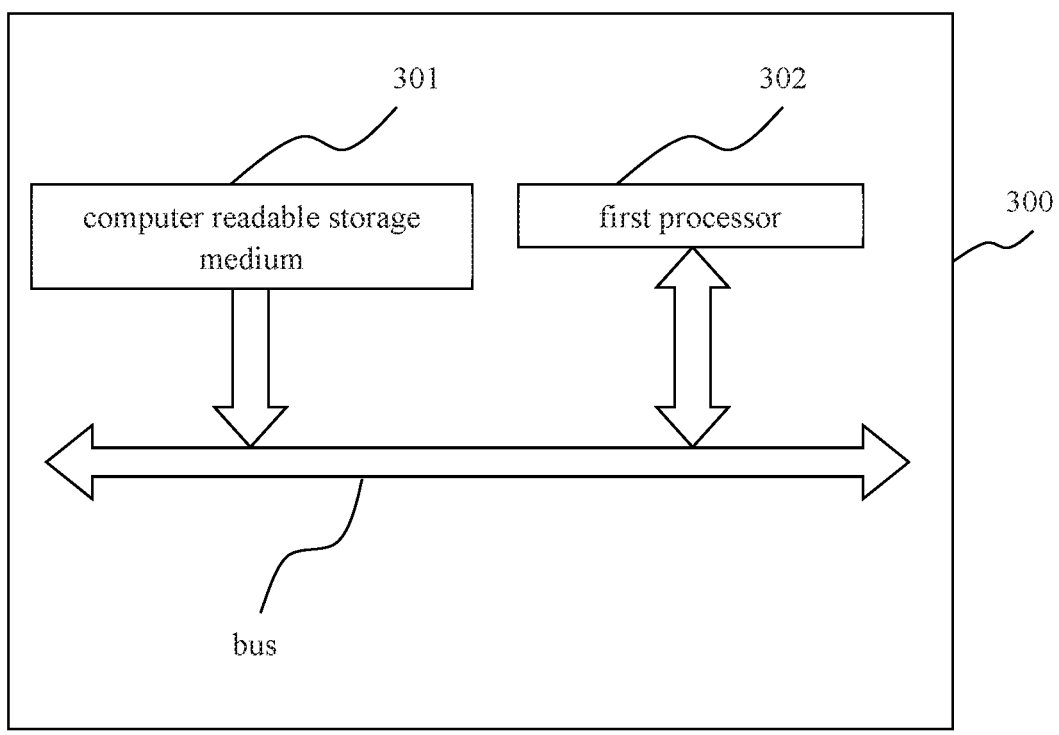
FIG. 3 is a structural diagram of a device for three-dimensional modeling provided by Embodiment Three of the present invention.

A device 300 for three-dimensional modeling provided by Embodiment Three of the present invention will be described in detail below with reference to FIG. 3. The device includes computer readable storage medium 301. The computer readable storage medium 301 stores a computer program. When the computer program is executed by a first processor 302, the steps of the method in the Embodiment One is performed, as shown in FIG. 3. Optionally, the device 300 can include a bus.

By the method described in the embodiment of the present invention, only one color image and a depth map corresponding to the color image are required to improve the efficiency of the facial three-dimensional modeling and meanwhile improve the accuracy of modeling. Preferably, if there are a plurality of color images and the depth maps corresponding to the color images, the accuracy of the modeling can be further improved by the method.

Figure 4:
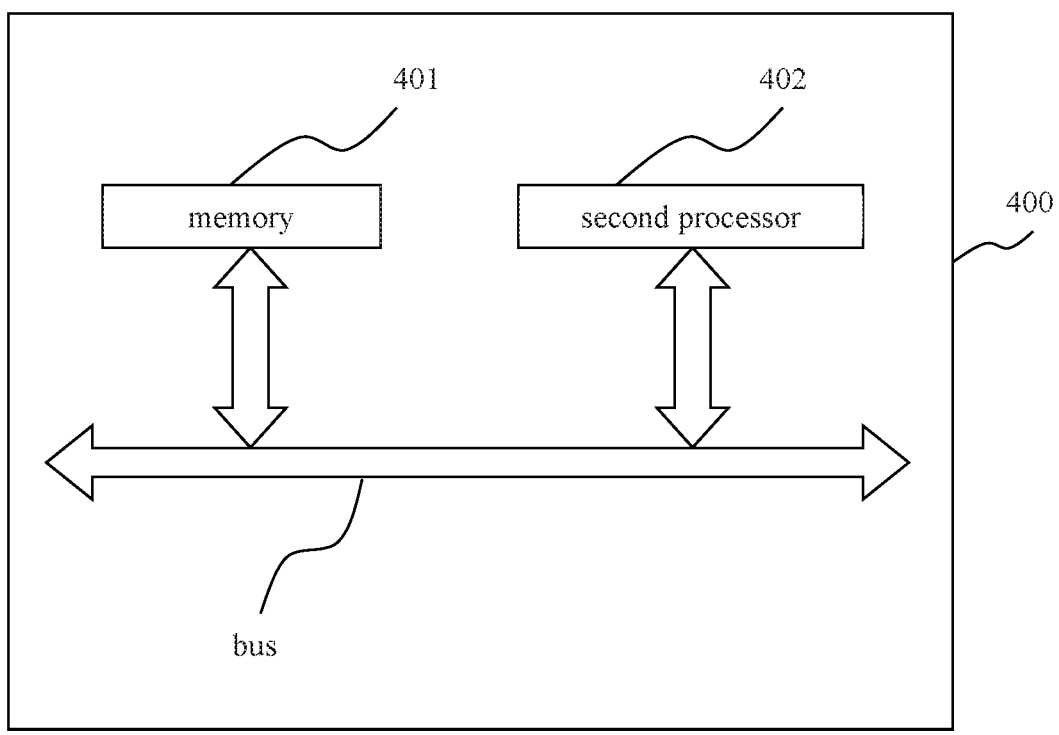
FIG. 4 is a structural diagram of a device for three-dimensional modeling provided by Embodiment Four of the present invention.

A device 400 for three-dimensional modeling provided by Embodiment Four of the present invention will be described in detail below with reference to FIG. 4. The device includes memory 401, second processor 402 and computer program stored in the memory and operated by the second processor. When the computer program is executed by the second processor 402, the steps of the method in Embodiment One is performed, as shown in FIG. 4. Optionally, the device 400 can include a bus.

By the method described in the embodiment of the present invention, only one color image and a depth map corresponding to the color image are required to improve the efficiency of the facial three-dimensional modeling and meanwhile improve the accuracy of modeling. Preferably, if there are a plurality of color images and the depth maps corresponding to the color images, the accuracy of the modeling can be further improved by the method.

As an example, the computer program can be partitioned into one or a plurality of modules/units. The one or the plurality of modules/units are stored in the memory, and executed by the processor to accomplish the present invention. The one or more modules/units can be a series of computer program instruction sections capable of performing a specific function. The instruction sections are used to describe the execution process of the computer program in the device/terminal equipment.

The device/terminal can be a computing device such as a mobile phone, a tablet computer, a desktop computer, a laptop, a palmtop computer, and a cloud server. The device/terminal can include, but is not limited to, a processor and a memory. It will be understood by the persons skilled in the art that the schematic diagram of the present invention is merely an example of a device/terminal, and does not form a limitation of the device/terminal. The device/terminal can include more or less components than that shown in the schematic diagram, or a combination of certain components, or different components. For example, the device/terminal can also include input and output devices, network access devices, buses, etc.

The processor can be a Central Processing Unit (CPU), and also can be other general-purpose processor, a Digital Signal Processor (DSP), an Application Specific Integrated Circuit (ASIC), a Field-Programmable Gate Array (FPGA) or other programmable logic device, discrete gate or transistor logic device, discrete hardware components, etc. The general-purpose processor can be a microprocessor or any conventional processor or the like. The processor is a control center of the device/terminal, and each part of the entire device/terminal is connected through various interfaces and circuits.

The memory can be used to store the computer program and/or the module. The processor performs various functions of the device/terminal by operating or executing the computer program and/or the module stored in the memory, and calling the data stored in the memory. The memory can include a program storage area and a data storage area, wherein the program storage area can store an operating system, an application program required by at least one function (such as an image playing function, etc.), and so on; the data storage area can store the data (such as video data, images, etc.) generated according to the usage of the mobile phone. Besides, the memory can include a high-speed RAM, and also can include a non-volatile memory (such as a hard disk, a memory, a plug-in hard disk, a Smart Media Card (SMC), a Secure Digital (SD) card, a flash card, at least one disk storage device, a flash memory device, etc.) or other volatile/non-volatile solid-state storage devices.

The module/unit integrated by the device/terminal can be stored in a computer readable storage medium if it is performed in the form of a software functional unit, and sold or used as a standalone product. Based on such understanding, the present invention performs all or part of the processes of the above-mentioned embodiments, and also can perform by instructing related hardware by a computer program. The computer program can be stored in a computer readable storage medium. The steps of the above-mentioned various method embodiments can be performed when the computer program is executed by the processor, wherein the computer program includes computer program codes; the computer program codes can be a source code form, an object code form, an executable file or some intermediate form. The computer readable medium can include any entity or device capable of carrying the computer program code, a recording medium, a USB flash dish, a mobile hard disk, a magnetic disk, an optical disk, a computer memory, an ROM, an RAM, an electrical carrier signal, a telecommunications signal, a software distribution media, etc.

The imaging of the target object in the above-mentioned embodiments can be the partial imaging of the target object, and also can be the integral imaging. The method or the device provided by the present invention is applicable to the partial imaging, or the integral imaging, or the partial imaging or the integral imaging after related adjustments. The above-mentioned adjustments do not require any creative work, and should belong to the protection scope of the present invention.

The invention claimed is:

1. A method for three-dimensional modeling, comprising:
   receiving a first two-dimensional image and a depth map corresponding to the first two-dimensional image, wherein the first two-dimensional image and the depth map respectively comprises a face; and
   fitting a three-dimensional face model by a first three-dimensional face database according to a position of a face feature point in the first two-dimensional image and the depth map corresponding to the first two-dimensional image.

2. The method according to claim 1, wherein
   the first three-dimensional face database comprises an average face model and at least one of the following: a shape feature vector and an expression feature vector.

3. The method according to claim 2, wherein
   the step of fitting the three-dimensional face model by the first three-dimensional face database according to the position of the face feature point in the first two-dimensional image and the depth map corresponding to the first two-dimensional image comprises:
   estimating an initial transformation matrix of a three-dimensional point cloud model corresponding to the depth map from the average face model, according to the initial transformation matrix and at least one of the following: the shape feature vector and the expression feature vector, and aiming at a first condition, fitting the three-dimensional face model from the average face model.

4. The method according to claim 3, wherein the first condition comprises at least one of the following:
   a distance between a projection position of a feature point of the three-dimensional face model in an image coordinate system and the position of the feature point of the first two-dimensional image corresponding to the feature point of the three-dimensional face model is smallest; and
   a distance between the three-dimensional face model and a point pair corresponding to the three-dimensional point cloud mapped by the depth map is smallest.

5. The method according to claim 3, wherein
   the step of estimating the initial transformation matrix of the three-dimensional point cloud model corresponding to the depth map by the average face model comprises:

calculating a three-dimensional position of the face feature point according to the position of the face feature point in the first two-dimensional image and the depth map corresponding to the first two-dimensional image; and estimating the initial transformation matrix of the three-dimensional point cloud model corresponding to the depth map from the average face model according to the three-dimensional position of the face feature point and the three-dimensional position of the feature point of the average face model.

6. A device for three-dimensional modeling, comprising:
a receiver, configured to receive a first two-dimensional image and a depth map corresponding to the first two-dimensional image, wherein the first two-dimensional image and the depth map respectively comprise a face; and
a processor, configured to fit a three-dimensional face model by a first three-dimensional face database according to a position of a face feature point in the first two-dimensional image and the depth map corresponding to the first two-dimensional image.

7. The device according to claim 6, wherein
the first three-dimensional face database comprises an average face model and at least one of the following: a shape feature vector and an expression feature vector.

8. The device according to claim 7, wherein
the processor is specifically configured to:
estimate an initial transformation matrix of a three-dimensional point cloud model corresponding to the depth map from the average face model, according to the initial transformation matrix and at least one of the following: the shape feature vector and the expression feature vector, and aiming at a first condition, fitting the three-dimensional face model from the average face model.

9. The device according to claim 8, wherein the first condition comprises at least one of the following:
a distance between a projection position of a feature point of the three-dimensional face model in the image coordinate system and the position of the feature point of the first two-dimensional image corresponding to the feature point of the three-dimensional face model is smallest; and
a distance between the three-dimensional face model and a point pair corresponding to the three-dimensional point cloud mapped by the depth map is smallest.

10. The device according to claim 8, wherein the processor is specifically configured to:
calculate a three-dimensional position of the face feature point according to the position of the face feature point in the first two-dimensional image and the depth map corresponding to the first two-dimensional image; and
estimate the initial transformation matrix of the three-dimensional point cloud model corresponding to the depth map from the average face model according to the three-dimensional position of the face feature point and the three-dimensional position of the feature point of the average face model.

11. A computer readable storage medium, storing a computer program, wherein when the computer program is executed by a first processor, the following steps are performed:
receiving a first two-dimensional image and a depth map corresponding to the first two-dimensional image, wherein the first two-dimensional image and the depth map respectively comprises a face; and fitting a three-dimensional face model by a first three-dimensional face database according to a position of a face feature point in the first two-dimensional image and the depth map corresponding to the first two-dimensional image.

12. A device for three-dimensional modeling, comprising a memory, a second processor, and a computer program stored in the memory and operated by the second processor, wherein when the computer program is executed by the second processor, the following steps are performed:
receiving a first two-dimensional image and a depth map corresponding to the first two-dimensional image, wherein the first two-dimensional image and the depth map respectively comprises a face; and
fitting a three-dimensional face model by a first three-dimensional face database according to a position of a face feature point in the first two-dimensional image and the depth map corresponding to the first two-dimensional image.

13. The method according to claim 4, wherein
the step of estimating the initial transformation matrix of the three-dimensional point cloud model corresponding to the depth map by the average face model comprises:
calculating a three-dimensional position of the face feature point according to the position of the face feature point in the first two-dimensional image and the depth map corresponding to the first two-dimensional image; and
estimating the initial transformation matrix of the three-dimensional point cloud model corresponding to the depth map from the average face model according to the three-dimensional position of the face feature point and the three-dimensional position of the feature point of the average face model.

14. The device according to claim 9, wherein the processor is specifically configured to:
calculate a three-dimensional position of the face feature point according to the position of the face feature point in the first two-dimensional image and the depth map corresponding to the first two-dimensional image; and
estimate the initial transformation matrix of the three-dimensional point cloud model corresponding to the depth map from the average face model according to the three-dimensional position of the face feature point and the three-dimensional position of the feature point of the average face model.

15. The computer readable storage medium according to claim 11, wherein
the first three-dimensional face database comprises an average face model and at least one of the following: a shape feature vector and an expression feature vector.

16. The computer readable storage medium according to claim 11, wherein
the step of fitting the three-dimensional face model by the first three-dimensional face database according to the position of the face feature point in the first two-dimensional image and the depth map corresponding to the first two-dimensional image comprises:
estimating an initial transformation matrix of a three-dimensional point cloud model corresponding to the depth map from the average face model; according to the initial transformation matrix and at least one of the following: the shape feature vector and the expression feature vector, and aiming at a first condition, fitting the three-dimensional face model from the average face model.

17. The computer readable storage medium according to claim 16, wherein
the first condition comprises at least one of the following:
a distance between a projection position of a feature point of the three-dimensional face model in an image coordinate system and the position of the feature point of the first two-dimensional image corresponding to the feature point of the three-dimensional face model is smallest; and
a distance between the three-dimensional face model and a point pair corresponding to the three-dimensional point cloud mapped by the depth map is smallest.

18. The computer readable storage medium according to claim 16, wherein
the step of estimating the initial transformation matrix of the three-dimensional point cloud model corresponding to the depth map by the average face model comprises:
calculating a three-dimensional position of the face feature point according to the position of the face feature point in the first two-dimensional image and the depth map corresponding to the first two-dimensional image; and
estimating the initial transformation matrix of the three-dimensional point cloud model corresponding to the depth map from the average face model according to the three-dimensional position of the face feature point and the three-dimensional position of the feature point of the average face model.

19. The computer readable storage medium according to claim 17, wherein
the step of estimating the initial transformation matrix of the three-dimensional point cloud model corresponding to the depth map by the average face model comprises:
calculating a three-dimensional position of the face feature point according to the position of the face feature point in the first two-dimensional image and the depth map corresponding to the first two-dimensional image; and
estimating the initial transformation matrix of the three-dimensional point cloud model corresponding to the depth map from the average face model according to the three-dimensional position of the face feature point and the three-dimensional position of the feature point of the average face model.

20. The device for three-dimensional modeling according to claim 12, wherein
the first three-dimensional face database comprises an average face model and at least one of the following: a shape feature vector and an expression feature vector.

21. The device for three-dimensional modeling according to claim 20, wherein
the step of fitting the three-dimensional face model by the first three-dimensional face database according to the position of the face feature point in the first two-dimensional image and the depth map corresponding to the first two-dimensional image comprises:
estimating an initial transformation matrix of a three-dimensional point cloud model corresponding to the depth map from the average face model; according to the initial transformation matrix and at least one of the following: the shape feature vector and the expression feature vector, and aiming at a first condition, fitting the three-dimensional face model from the average face model.

22. The device for three-dimensional modeling according to claim 21, wherein
the first condition comprises at least one of the following:
a distance between a projection position of a feature point of the three-dimensional face model in an image coordinate system and the position of the feature point of the first two-dimensional image corresponding to the feature point of the three-dimensional face model is smallest; and
a distance between the three-dimensional face model and a point pair corresponding to the three-dimensional point cloud mapped by the depth map is smallest.18. The computer readable storage medium according to claim 11, storing a computer program, wherein the steps of the claim 5 is performed when the computer program is executed by a first processor.

23. The device for three-dimensional modeling according to claim 21, wherein
the step of estimating the initial transformation matrix of the three-dimensional point cloud model corresponding to the depth map by the average face model comprises:
calculating a three-dimensional position of the face feature point according to the position of the face feature point in the first two-dimensional image and the depth map corresponding to the first two-dimensional image; and
estimating the initial transformation matrix of the three-dimensional point cloud model corresponding to the depth map from the average face model according to the three-dimensional position of the face feature point and the three-dimensional position of the feature point of the average face model.

24. The device for three-dimensional modeling according to claim 22, wherein
the step of estimating the initial transformation matrix of the three-dimensional point cloud model corresponding to the depth map by the average face model comprises:
calculating a three-dimensional position of the face feature point according to the position of the face feature point in the first two-dimensional image and the depth map corresponding to the first two-dimensional image; and
estimating the initial transformation matrix of the three-dimensional point cloud model corresponding to the depth map from the average face model according to the three-dimensional position of the face feature point and the three-dimensional position of the feature point of the average face model.

* * * * *